US008271968B2

(12) United States Patent
Woodbury et al.

(10) Patent No.: US 8,271,968 B2
(45) Date of Patent: Sep. 18, 2012

(54) SYSTEM AND METHOD FOR TRANSPARENT HARD DISK DRIVE UPDATE

(75) Inventors: Russell Woodbury, Round Rock, TX (US); Don H. Walker, Katy, TX (US); Frank Widjaja Yu, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 1680 days.

(21) Appl. No.: 11/609,356

(22) Filed: Dec. 12, 2006

(65) Prior Publication Data

US 2008/0141235 A1 Jun. 12, 2008

(51) Int. Cl.
G06F 9/44 (2006.01)
G06F 9/46 (2006.01)

(52) U.S. Cl. ........ 717/170; 717/169; 717/171; 718/103; 718/104

(58) Field of Classification Search .................. None
See application file for complete search history.

(56) References Cited

U.S. PATENT DOCUMENTS

| | | | | |
|---|---|---|---|---|
| 5,535,355 A * | 7/1996 | Scales | ............................ | 711/101 |
| 5,566,317 A * | 10/1996 | Treiber et al. | .................. | 711/117 |
| 5,596,738 A * | 1/1997 | Pope | ............................ | 711/103 |
| 5,717,887 A * | 2/1998 | Leslie | ............................ | 717/173 |
| 5,765,189 A * | 6/1998 | Treiber et al. | .................. | 711/117 |
| 5,781,921 A * | 7/1998 | Nichols | ........................... | 711/115 |
| 5,787,491 A * | 7/1998 | Merkin et al. | ................. | 711/173 |
| 5,835,933 A * | 11/1998 | Wells et al. | .................... | 711/103 |
| 5,878,256 A * | 3/1999 | Bealkowski et al. | ............. | 713/2 |
| 6,009,497 A * | 12/1999 | Wells et al. | .................... | 711/103 |
| 6,266,809 B1 * | 7/2001 | Craig et al. | .................... | 717/173 |
| 6,357,021 B1 * | 3/2002 | Kitagawa et al. | ............... | 714/41 |
| 6,370,645 B1 * | 4/2002 | Lee | ..................... | 713/2 |
| 6,523,083 B1 * | 2/2003 | Lin et al. | ....................... | 711/103 |
| 6,675,258 B1 * | 1/2004 | Bramhall et al. | ............. | 711/114 |
| 6,675,293 B1 * | 1/2004 | Beebe et al. | ...................... | 713/1 |
| 6,708,231 B1 * | 3/2004 | Kitagawa | ........................ | 710/10 |
| 6,820,211 B2 * | 11/2004 | Kalman | ........................ | 714/6.22 |
| 6,930,785 B1 * | 8/2005 | Weyand et al. | ................. | 358/1.1 |
| 6,944,653 B2 * | 9/2005 | Fong et al. | ..................... | 709/220 |
| 7,032,218 B2 * | 4/2006 | Shirasawa et al. | ............ | 717/168 |
| 7,069,452 B1 * | 6/2006 | Hind et al. | ........................ | 713/1 |
| 7,073,017 B2 * | 7/2006 | Yamamoto | .................... | 711/103 |
| 7,086,049 B2 * | 8/2006 | Goodman | ...................... | 717/168 |
| 7,181,458 B1 * | 2/2007 | Higashi | .......................... | 707/695 |
| 7,185,191 B2 * | 2/2007 | Bosley et al. | ...................... | 713/2 |
| 7,191,437 B1 * | 3/2007 | Coatney et al. | ................ | 717/174 |
| 7,197,634 B2 * | 3/2007 | Kruger et al. | ...................... | 713/1 |
| 7,281,124 B2 * | 10/2007 | Rothman et al. | ................... | 713/1 |
| 7,313,682 B2 * | 12/2007 | Kanapathipillai et al. | ......... | 713/2 |
| 7,356,727 B1 * | 4/2008 | McGhee et al. | .................. | 714/2 |
| 7,426,633 B2 * | 9/2008 | Thompson et al. | ............... | 713/2 |
| 7,454,547 B1 * | 11/2008 | Nallagatla et al. | ............. | 710/260 |
| 7,536,536 B1 * | 5/2009 | Joshi et al. | ......................... | 713/1 |

(Continued)

*Primary Examiner* — Tuan Q Dam
*Assistant Examiner* — Zheng Wei
(74) *Attorney, Agent, or Firm* — Hamilton & Terrile, LLP; Robert W. Holland

(57) ABSTRACT

Information handling system hard disk drive firmware updates are initiated on a hard disk drive without disrupting operations of the information handling system. A firmware update is copied in executable form to the hard disk drive's buffer and executed by the hard disk drive's controller without aborting queued tasks or losing system synchronization. The controller then copies the firmware update to flash memory in parallel with execution of the firmware update so that the hard disk drive operates with minimal degradation in performance.

19 Claims, 3 Drawing Sheets

U.S. PATENT DOCUMENTS

| | | | |
|---|---|---|---|
| 7,558,915 B2* | 7/2009 | Cherian et al. | 711/114 |
| 7,600,055 B2* | 10/2009 | Douglas et al. | 710/19 |
| 7,716,286 B2* | 5/2010 | Heins et al. | 709/204 |
| 7,730,295 B1* | 6/2010 | Lee | 713/100 |
| 7,797,693 B1* | 9/2010 | Gustafson et al. | 717/168 |
| 2002/0166027 A1* | 11/2002 | Shirasawa et al. | 711/114 |
| 2003/0055919 A1* | 3/2003 | Fong et al. | 709/220 |
| 2003/0069951 A1* | 4/2003 | Fong et al. | 709/222 |
| 2003/0074657 A1* | 4/2003 | Bramley, Jr. | 717/168 |
| 2003/0110369 A1 | 6/2003 | Fish et al. | 713/1 |
| 2003/0154471 A1* | 8/2003 | Teachman et al. | 717/171 |
| 2003/0163508 A1* | 8/2003 | Goodman | 709/100 |
| 2004/0030877 A1* | 2/2004 | Frid | 713/1 |
| 2004/0031029 A1* | 2/2004 | Lee et al. | 717/171 |
| 2004/0034745 A1 | 2/2004 | Hameed | 711/135 |
| 2004/0076043 A1* | 4/2004 | Boals et al. | 365/200 |
| 2004/0083469 A1* | 4/2004 | Chen et al. | 717/168 |
| 2004/0133711 A1* | 7/2004 | Chen et al. | 710/22 |
| 2004/0225873 A1* | 11/2004 | Diaz | 713/1 |
| 2004/0230963 A1* | 11/2004 | Rothman et al. | 717/168 |
| 2005/0055595 A1* | 3/2005 | Frazer et al. | 713/400 |
| 2005/0144609 A1* | 6/2005 | Rothman et al. | 717/168 |
| 2005/0160257 A1* | 7/2005 | Kruger et al. | 713/2 |
| 2005/0188170 A1* | 8/2005 | Yamamoto | 711/170 |
| 2005/0223373 A1* | 10/2005 | Gage et al. | 717/168 |
| 2005/0257215 A1* | 11/2005 | Denby et al. | 717/172 |
| 2006/0015781 A1 | 1/2006 | Rothman et al. | 714/100 |
| 2006/0020779 A1* | 1/2006 | Rothman et al. | 713/2 |
| 2006/0224821 A1* | 10/2006 | Chen et al. | 711/103 |
| 2006/0259756 A1* | 11/2006 | Thompson et al. | 713/2 |
| 2006/0277328 A1* | 12/2006 | Cherian et al. | 710/36 |
| 2007/0174601 A1* | 7/2007 | Douglas et al. | 713/1 |
| 2007/0226413 A1* | 9/2007 | Elliott et al. | 711/114 |
| 2008/0046877 A1* | 2/2008 | Ford | 717/168 |
| 2008/0052506 A1* | 2/2008 | Iima et al. | 713/1 |
| 2008/0109647 A1* | 5/2008 | Gavens et al. | 713/2 |
| 2008/0126803 A1* | 5/2008 | Ginter et al. | 713/168 |

* cited by examiner

SYSTEM AND METHOD FOR TRANSPARENT HARD DISK DRIVE UPDATE

BACKGROUND OF THE INVENTION

1. Field of the Invention

The present invention relates in general to the field of information handling system hard disk drives, and more particularly to a system and method for transparent hard disk drive update.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

During normal operations, information handling systems typically depend on one or more hard disk drives to store information. Hard disk drives generally have one or more magnetic disks that provide persistent storage of information when the information handling system is powered down. Often, hard disk drives are used to store an operating system so that upon application of power the central processing unit (CPU) can retrieve the operating system in a bootstrapping process. Basic communications between the hard disk drive and CPU are managed through standardized bus systems, such SCSI or SAS bus systems, by a microcontroller included in the hard disk drive. The microcontroller operates based on firmware instructions stored in persistent memory of the hard disk drive. The hard disk drive firmware is generally "flashed" or loaded at manufacture of the hard disk drive so that the hard disk drive is prepared to interact with information handling systems when first powered up. However, hard disk drives do typically have a capability to re-flash the firmware in the event that an update is subsequently needed to the operations of the hard disk drive.

A number of difficulties exist with attempts to update hard disk drive firmware in an information handling system. These difficulties generally relate to the current process for performing firmware updates, which involves taking the hard disk drive offline while the firmware is updated. One concern is that taking the hard disk drive offline causes system downtime while the update to firmware takes place. For example, updates are stored in the hard disk drive buffer so that normal hard disk drive operations are halted and then power is cycled to bring the firmware into operation. The downtime involved with hard disk drive updates discourages end users from performing updates unless the danger of continuing with the current firmware is high. Thus, end users tend to avoid periodic hard disk drive updates made for proactive maintenance until a critical update arises that corrects potential problems of critical magnitude. This approach leaves hard disk drive operations susceptible to known vulnerabilities of lesser magnitude between critical updates.

SUMMARY OF THE INVENTION

Therefore a need has arisen for a system and method which provides transparent hard disk drive updates performed in parallel with normal hard disk drive operations.

In accordance with the present invention, a system and method are provided which substantially reduce the disadvantages and problems associated with previous methods and systems for performing hard disk drive firmware updates. A firmware update is copied to a hard disk drive buffer and executed to manage hard disk drive operations without loss of synchronization or aborting queued tasks. The firmware update is background written to flash memory in parallel with normal hard disk drive operations.

More specifically, an information handling system interfaces with a hard disk drive through a bus. The hard disk drive has a controller that manages I/O tasks through the bus, such as writes or reads of information, by executing firmware instructions stored in flash memory and loaded into a buffer, such as DRAM. A firmware update module associated with the hard disk drive, such as instructions running on the controller, receives a firmware update through the bus interface and loads the firmware update in executable form in the buffer. The firmware update module ensures that queued tasks are not aborted by, for instance, flushing or storing queued tasks before execution of the firmware update. New tasks that arrive before execution of the firmware update are either refused with a busy or check condition status or, alternatively, stored for subsequent execution. Once the firmware update is executed from the buffer, the stored tasks are retrieved and executed, new tasks are actively managed, and the firmware update is background written to flash memory with limited controller resources so as to avoid excessive degradation of normal hard disk drive operations.

The present invention provides a number of important technical advantages. One example of an important technical advantage is that hard disk drive firmware updates are performed quickly in a transparent manner with minimal interference to normal hard disk drive operations. For example, outstanding I/O requests to the hard disk drive are not aborted to perform a firmware update. Firmware updates are interleaved with normal hard disk drive operations so that no loss of synchronization occurs in hard disk drive operations. By using busy status and check condition responses at specific points during the firmware update, the hard disk drive maintains its link with the information handling system throughout the firmware download process so that vulnerability to interrupted downloads is reduced from approximately 30 seconds with conventional downloads to approximately 2 seconds. Updates interleaved with normal I/O operations have a minimal impact on hard disk drive performance of approximately a 10% degradation for a typical period of 20 seconds or less.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Firmware updates for information handling system hard disk drives are executed without loss of synchronization or undue degradation of normal operations. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
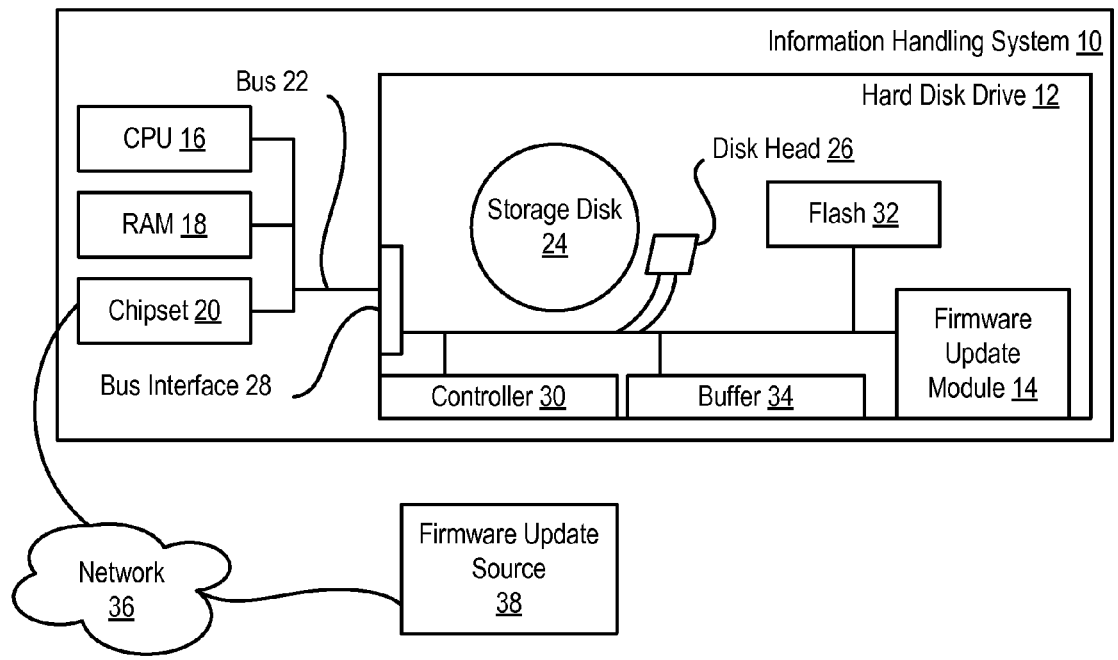
FIG. 1 depicts a block diagram of an information handling system having a hard disk drive firmware update module.

Referring now to FIG. 1, a block diagram depicts an information handling system 10 having a hard disk drive 12 firmware update module 14. Information handling system 10 is built from a variety of processing components, such as a CPU 16, RAM 18 and chipset 20 that interact with hard disk drive 12 through a bus 22. Hard disk drive 12 has a magnetic storage disk 24 that spins relative to a disk head 26 to allow writes and reads of information communicated with the processing components through bus 22 and a bus interface 28. Writes and reads of information are managed by a controller 30 running firmware retrieved from a flash 32 and loaded in executable form into a buffer 34, such as DRAM. The firmware is periodically updated through a network 36 with firmware updates provided by a firmware update source 38. Firmware update module 14 retrieves a firmware update sent to information handling system 10 from bus interface 28, stores the firmware update in buffer 34 in executable form, executes the firmware update on controller 30 to manage reads and writes of information, and then copies the firmware update to flash memory 32 in parallel while executing the firmware update on the controller 30. Firmware update module 14 executes the firmware update on controller 30 without aborting tasks queued for the controller to manage, such as reads and writes of information. Firmware update module 14 is, for instance, an application running on controller 30, a hardware solution or other solution capable of managing hard disk drive operations.

Figure 2:
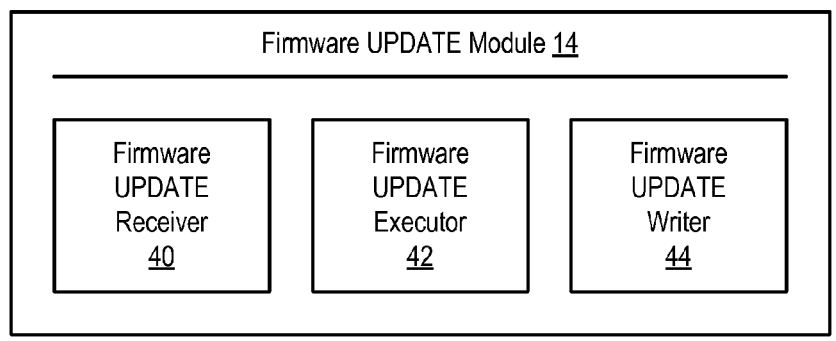
FIG. 2 depicts a block diagram of a firmware update module.

Referring now to FIG. 2, a block diagram depicts a firmware update module 14. A firmware update receiver 40 receives the firmware update from bus interface 28 and stores the firmware update in executable form in buffer 34. In one embodiment, firmware update receiver 40 leverages storage disk 24 to store the firmware update for subsequent transfer to buffer 34. Firmware update receiver 40 checks the firmware image upon completion of the download to ensure an accurate image or otherwise attempt another download. Once the firmware update is in executable form in buffer 34, firmware update executor 42 executes the firmware update without a loss of synchronization or loss of queued tasks, typically in a time period of two seconds or less. Firmware update executor 42 manages queued tasks of controller 30 by either flushing the queue to accomplish the tasks before executing the firmware update or storing the queued tasks during the executing of the firmware update and restoring the stored tasks for subsequent management by the executing firmware update. In addition, firmware update executor 42 manages new tasks sent to controller 30 before executing the firmware update by responding with a busy status to the new tasks or by storing the new tasks for management after execution of the firmware update. Once the firmware update is executing on controller 30 to manage operations of hard disk drive 12, a firmware update writer 44 performs a background write of the firmware update image to flash memory 32. The background write occurs in parallel with normal operations of controller 30 by taking a limited number of processor cycles so that any degradation of performance of controller 30 in managing operations of hard disk drive 12 are insubstantial, such as no more than approximately ten percent degradation.

Figure 3:
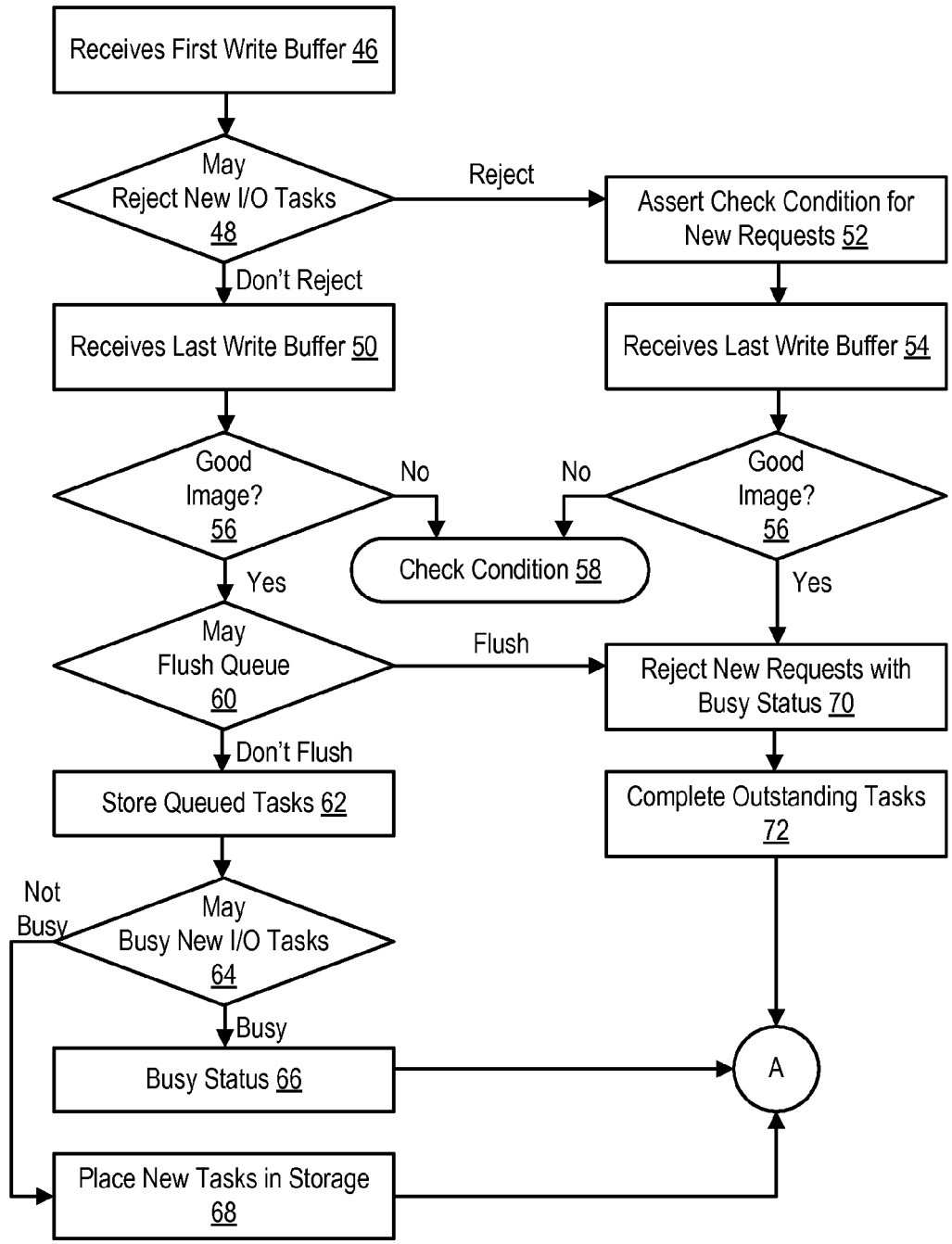
FIG. 3 depicts a flow diagram of a process for executing a firmware update at a hard disk drive controller without loss of synchronization.

Referring now to FIG. 3, a flow diagram depicts a process for executing a firmware update at a hard disk drive controller without loss of synchronization. The process begins at step 46 with receipt of a first write buffer associated with a firmware update. At step 48, a determination is made of whether to reject or not reject new I/O tasks. If not rejected, the write buffers continue in parallel with new I/O tasks until the last write buffer is received at step 50. If new I/O tasks are rejected, the process continues to step 52 to assert a check condition for new requests so that new I/O task requests are not sent until the firmware update is complete. After receiving the last write buffer at steps 50 and 54, the process continues to step 56 to check if the firmware update image is a good image. If a fault has occurred in the download of the firmware update, the process ends at step 58 with a check condition so that another update attempt may take place.

Once the firmware image is stored in the buffer in executable form, the process continues to step 60 or step 70 based upon whether new I/O tasks were rejected at step 48. If new tasks were not rejected, the process continues to step 60 to determine whether to flush the queue of pending tasks by executing those queued tasks before executing the firmware update. If the determination at step 60 is to not flush the queue, the queued tasks are stored at step 62 and the process continues to step 64 to determine whether to busy new I/O tasks. If a determination is made to busy new I/O tasks, a busy status is issued at step 66 and the firmware update is executed. If a determination is made at step 64 not to busy new tasks, the new tasks are placed in storage at step 68 and the firmware update is executed. If a determination is made at step 60 to flush the queue by executing queued tasks or new tasks are rejected at step 48, the process continues to step 70 to reject new task requests with a busy status and to step 72 to complete outstanding queued tasks so that the firmware update can be executed. Busy and check condition statuses are selectively used as illustrated in FIG. 3 so that a firmware update is executed without a loss of synchronization and in a time period of two seconds or less. The determination of whether to enforce busy and check condition statuses may be based upon the number of queued tasks, the time expected to execute the firmware update or other factors.

Figure 4:
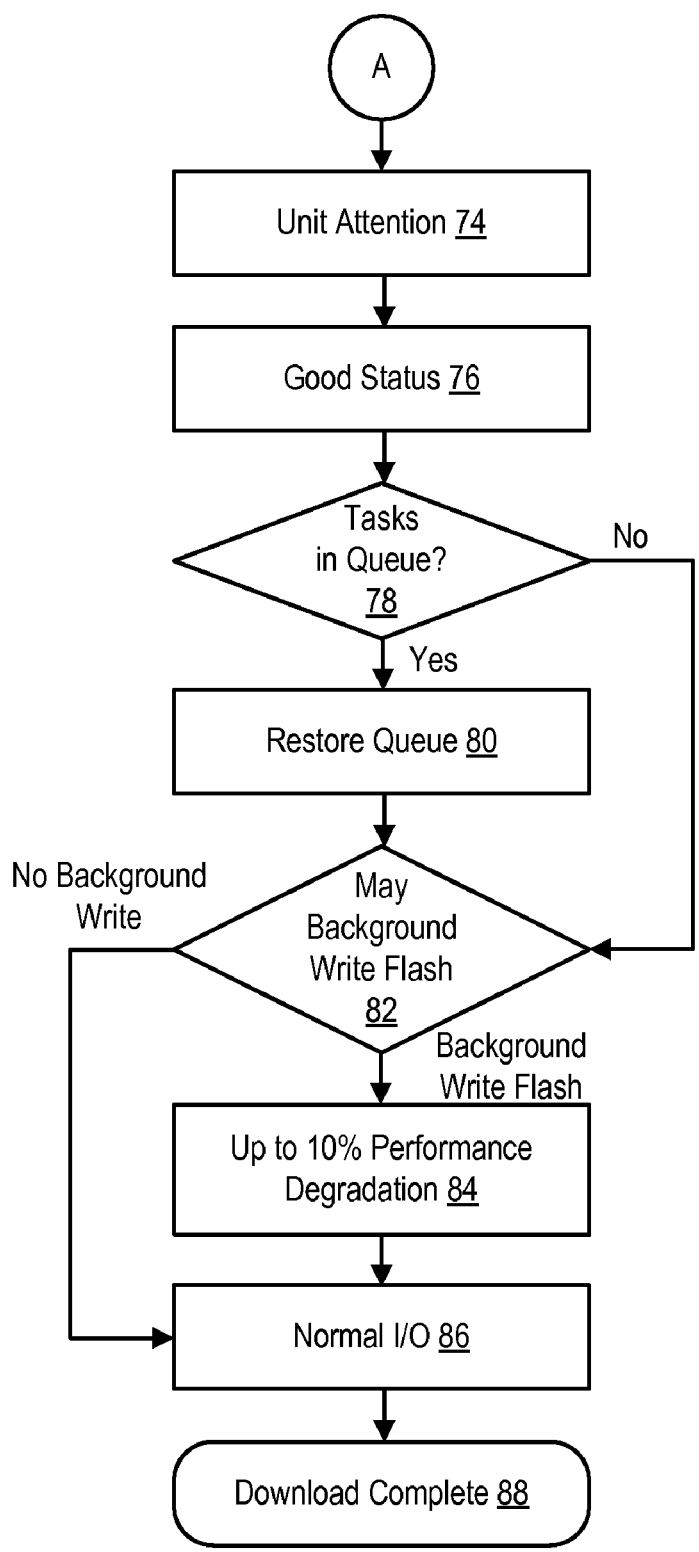
FIG. 4 depicts a flow diagram of a process for storing the firmware update to flash memory as a background operation to normal tasks.

Referring now to FIG. 4, a flow diagram depicts a process for storing the firmware update to flash memory as a background operation to normal tasks. The process begins at step 74 with a unit attention status while the firmware update is initiated and a good status at step 76 when the firmware update has taken over management of the hard disk drive. At step 78, a determination is made of whether tasks were in queue before execution of the firmware update. If queued tasks were stored, the process continues to step 80 to restore the queue. If no queued tasks were stored or all queued tasks are restored, the process continues to step 82 to determine if a background write to flash memory or the firmware update is needed. If so, the process continues to step 84 for the controller to write the firmware update to flash memory in parallel with execution of I/O tasks. The controller processing cycles dedicated to writing the firmware update are limited so that degradation of I/O tasks is limited by a predetermined amount, such as approximately ten percent. Once the firmware update is written to the flash memory, the process continues to step 86 to support normal I/O tasks and at step 88 the firmware update download is completed.

Although the present invention has been described in detail, it should be understood that various changes, substitutions and alterations can be made hereto without departing from the spirit and scope of the invention as defined by the appended claims.

What is claimed is:

1. An information handling system comprising:
  a processor operable to process information; and
  a hard disk drive interfaced with the processor through a bus, the hard disk drive having:
  a magnetic storage disk operable to store the information;
  a disk head operable to read the information stored on the magnetic storage disk and to write the information to the magnetic storage disk;
  a bus interface operable to communicate the information between the disk head and the bus;
  a controller interfaced with the disk head and the bus interface, the controller operable to manage reads and writes of the information by the disk head;
  a buffer interfaced with the controller and the bus interface, the buffer operable to store the information;
  flash memory interfaced with the controller and having firmware for execution by the controller to manage the reads and writes of information; and
  a firmware update module operable to retrieve a firmware update from the bus interface, to store the firmware update in the buffer, to execute the firmware update on the controller from the buffer for managing reads and writes of the information by the disk head, and to copy the firmware update to the flash memory in parallel while executing the firmware update on the controller.

2. The information handling system of claim 1 wherein the firmware module copies the firmware update to the flash memory with the controller using a predetermined portion of a processing capacity of the controller.

3. The information handling system of claim 1 wherein the predetermined portion of the processing capacity comprises no more than a ten percent degradation in the managing of reads and writes of the information by the controller.

4. The information handling system of claim 1 wherein the firmware update module is further operable to store queued tasks of the controller before executing the firmware update and to restore the queued task to the controller after executing the firmware update.

5. The information handling system of claim 4 wherein the firmware update module is further operable to busy new tasks received after storing the queued tasks and until after executing the firmware update.

6. The information handling system of claim 4 wherein the firmware update module is further operable to store new tasks received after storing the queued tasks and to restore the new tasks after restoring the queued tasks.

7. The information handling system of claim 1 wherein the firmware module is further operable to store the firmware update on the magnetic storage disk for copying to the buffer.

8. The information handling system of claim 7 wherein the buffer comprises Dynamic Random Access Memory ("DRAM").

9. A method for updating firmware stored in flash memory of a hard disk drive, the method comprising:
  copying a firmware update to a buffer of the hard disk drive;
  executing the firmware update from the buffer with a controller to manage operation of the hard disk drive; and
  copying the firmware update to the flash memory in parallel with the executing of the firmware update, the flash memory interfaced with the controller and
  operable to provide the firmware for execution on the controller to manage operation of the hard disk drive.

10. The method of claim 9 wherein copying the firmware update to flash memory further comprises sharing the controller between the executing the firmware update and the copying the firmware update.

11. The method of claim 10 further comprising managing the sharing the controller to degrade the executing the firmware no more than a predetermined amount.

12. The method of claim 11 wherein the predetermined amount comprises approximately ten percent.

13. The method of claim 9 wherein copying a firmware update to a buffer further comprises:
  copying the firmware update to a hard disk drive; and
  copying the firmware update from the hard disk drive to the buffer in executable form.

14. The method of claim 9 wherein executing the firmware update from the buffer further comprises:
  storing queued tasks;
  busying new tasks;
  executing the firmware update;
  restoring the queued tasks for the firmware update to handle; and
  accepting new tasks for the firmware update to handle.

15. The method of claim 9 wherein executing the firmware update from the buffer further comprises:
  flushing queued tasks;
  busying new tasks;
  executing the firmware update; and
  accepting new tasks for the firmware update to handle.

16. A system for updating firmware of a hard disk drive, the system comprising:
  a firmware update receiver operable to copy a firmware update to a buffer of the hard disk drive;
  a firmware update executer operable to execute the firmware update from the buffer with a controller to manage operation of the hard disk drive; and
  a firmware update writer operable to copy the firmware update to the flash memory in parallel with the executing of the firmware update, the flash memory interfaced with the controller to store the firmware for execution by the controller to manage operation of the hard disk drive.

17. The system of claim 16 wherein the firmware update writer copies the firmware update to flash memory by sharing the controller between executing the firmware update and the copying the firmware update.

18. The system of claim 16 wherein the firmware update executer executes the firmware update by:
- storing queued tasks;
- busying new tasks;
- executing the firmware update;
- restoring the queued tasks for the firmware update to handle; and
- accepting new tasks for the firmware update to handle.

19. The system of claim 16 wherein the firmware update executer executes the firmware update by:
- flushing queued tasks;
- busying new tasks;
- executing the firmware update; and
- accepting new tasks for the firmware update to handle.

* * * * *